US008074852B2

(12) United States Patent
Crum, Jr. et al.

(10) Patent No.: US 8,074,852 B2
(45) Date of Patent: Dec. 13, 2011

(54) DETACHABLE COLLAPSIBLE BICYCLE BASKET

(75) Inventors: Daniel B. Crum, Jr., Maysville, KY (US); Dennis P. Pawsat, Maysville, KY (US); Chad D. Williamson, Maysville, KY (US)

(73) Assignee: Wald LLC, Maysville, KY (US)

( * ) Notice: Subject to any disclaimer, the term of this patent is extended or adjusted under 35 U.S.C. 154(b) by 489 days.

(21) Appl. No.: 12/398,690

(22) Filed: Mar. 5, 2009

(65) Prior Publication Data

US 2010/0224662 A1   Sep. 9, 2010

(51) Int. Cl.
*B62J 11/00* (2006.01)
(52) U.S. Cl. ........................................................ 224/432
(58) Field of Classification Search .................. 224/432, 224/419, 430, 434
See application file for complete search history.

(56) References Cited

U.S. PATENT DOCUMENTS

| 567,159 | A | * | 9/1896 | Le Grand Peirce | ........... | 224/432 |
| 582,229 | A | * | 5/1897 | Reynolds | ..................... | 224/432 |
| 1,967,002 | A | * | 7/1934 | Agee | ............... | 224/421 |
| 2,168,916 | A | * | 8/1939 | Pawsat | .......................... | 224/434 |
| 2,704,626 | A | | 3/1955 | Meier, Jr. | | |
| 2,890,819 | A | | 6/1959 | Glenny | | |
| 2,944,712 | A | | 7/1960 | Glenny | | |
| 3,039,663 | A | | 6/1962 | Glenny | | |
| 3,087,661 | A | | 4/1963 | Glenny | | |
| 3,157,327 | A | | 11/1964 | Karbin | | |
| 3,552,611 | A | | 1/1971 | Smith | | |
| 3,934,770 | A | | 1/1976 | Larsen | | |
| 3,995,803 | A | * | 12/1976 | Uitz | ............................... | 224/432 |
| 4,258,870 | A | * | 3/1981 | Edelson | ........................ | 224/454 |
| 4,282,993 | A | * | 8/1981 | Humlong | ..................... | 224/431 |
| 4,387,835 | A | * | 6/1983 | Golzer | .......................... | 224/417 |
| D310,809 | S | * | 9/1990 | Pawsat et al. | ................ | D12/407 |
| 5,271,540 | A | * | 12/1993 | Katz et al. | ..................... | 224/430 |
| 5,460,303 | A | * | 10/1995 | Downs | ......................... | 224/427 |
| 5,474,195 | A | * | 12/1995 | Pai | ................ | 220/4.26 |
| 5,497,919 | A | * | 3/1996 | Klinger | ........................ | 224/416 |
| 5,785,334 | A | * | 7/1998 | Robinson | ..................... | 280/204 |
| 6,527,153 | B1 | * | 3/2003 | Manos | ......................... | 224/427 |
| D496,321 | S | * | 9/2004 | McMurtrey et al. | ......... | D12/223 |
| D584,675 | S | * | 1/2009 | Crum, Jr. | ..................... | D12/223 |
| 2006/0196322 | A1 | * | 9/2006 | Chuang | ..................... | 81/177.85 |

OTHER PUBLICATIONS

Marshall Products Company, "Kola Folding Bike Basket" advertisement, San Diego, California (2 pages).

* cited by examiner

*Primary Examiner* — Brian D Nash
(74) *Attorney, Agent, or Firm* — Wood, Herron & Evans, LLP

(57) ABSTRACT

A collapsible detachable bicycle basket is constructed so as to be easily and readily mountable upon a luggage rack of a bicycle without the use of any threaded fasteners. To facilitate such mounting, the collapsible basket has a pair of spaced hooks attached to the top edge of one side of the basket and a resilient flexible connector in the form of a loop of bungee cord attached near the bottom of the same side of the basket. The hooks of the basket are receivable over a portion of the deck of the luggage rack and the loop of the bungee cord is attachable to a lower portion of the luggage rack to secure the basket to the luggage rack.

15 Claims, 9 Drawing Sheets

DETACHABLE COLLAPSIBLE BICYCLE BASKET

FIELD OF THE INVENTION

This invention relates to bicycle accessories, and more particularly, to collapsible bicycle baskets to be mounted upon a bicycle rear luggage rack.

BACKGROUND OF THE INVENTION

There have been numerous prior art attempts to commercialize bicycle baskets constructed so as to be mountable on opposite sides of a rear wheel of a bicycle. Examples of such prior attempts are disclosed, for example, in Meier U.S. Pat. No. 2,704,626; Glenny U.S. Pat. No. 2,890,819; and, Glenny U.S. Pat. No. 2,944,712. There have even been such attempts to mount such bicycle baskets on opposite sides of a rear wheel of a bicycle and to support those baskets from, or as part of, the rear luggage rack of the bicycle. Such an arrangement is disclosed, for example, in Smith U.S. Pat. No. 3,552,611.

There have also been collapsible bicycle baskets designed and built so as to be mounted upon opposite sides of the rear wheels of a bicycle. Such a collapsible bicycle basket is disclosed, for example, in an advertisement by Marshall Products Company of San Diego, Calif. for its "Kóla" folding bike basket. This "Kóla" folding bike basket is intended to be mounted in pairs on opposite sides of a rear luggage rack of a bicycle.

All of the bicycle baskets described hereinabove as part of the prior art, though, suffer from their commercial marketability because of the difficulty of writing easily understood instructions for the mounting of these bicycle baskets as accessories to be sold separately from the bicycle.

The saleability of bicycle accessories is, in substantial part, a function of the ease of mounting the accessory upon the bicycle. If the mounting is difficult or the instructions are complex, many customers will decide against buying that particular accessory. It has therefore been an objective of this invention to provide a collapsible bicycle basket which may be easily mounted upon the bicycle without the need for any complex mounting instructions.

It has been another objective of this invention to provide a detachable collapsible bicycle basket which may be mounted upon the rear luggage rack of a bicycle without the need for any nuts or bolts or similar attachment devices for securing the basket to the bicycle.

Still another objective of this invention has been to provide such a bicycle basket which may be easily detachably mounted and removed from a bicycle such that when the bicycle is used without the need for any baskets, the baskets may be easily removed, collapsed and set aside for future re-attachment when the need for those baskets reoccurs.

SUMMARY OF THE INVENTION

The invention of this application which accomplishes these objectives comprises a folding basket adapted to be detachably secured to a luggage rack of a bicycle without the use of any threaded or unthreaded fasteners. That folding basket comprises front and back walls, each of which is made from a pair of hingedly interconnected rigid panels. The basket also comprises a pair of opposed side walls hingedly connected at their opposite ends to one of the front and rear walls, and a bottom wall hingedly connected along one edge to the bottom edge of one of the side walls. The basket may be folded into a flat condition when the bottom wall is folded upwardly parallel to the side walls, and the front and rear walls collapsed inwardly about a hinge connection between the hinge panels of the front and rear walls. The basket is adapted to be attached to a rear luggage rack of a bicycle by means of two spaced hooks secured to the top of one of the side walls which fit over a portion of the rear luggage rack of the bicycle. A resilient connector in the form of a loop of bungee cord extends between and is connected to a bottom portion of the side wall to which the hooks are connected and a bottom portion of the luggage rack near the rear axle of the bicycle. Preferably, there is a spacer having a sawtooth-shaped outer edge secured to the same side wall of the basket as the hooks are mounted. This spacer receives braces of the luggage rack and serves to hold the basket side walls spaced from the frame and to prevent forward and backward movement of the basket during operation of the bicycle.

The side walls, bottom wall and front and rear walls of the bicycle basket are all made from rigid wire panels. Each panel is manufactured from a generally rectangularly shaped border wire and a plurality of connector wires extending between and welded at their opposite ends to opposite sides of the border wires. The bottom panel and the side walls each include additional connector wires extending normal to the first set of connector wires and welded at their intersections.

The basket preferably includes a generally hook-shaped locking clip pivotally connected to the top edge of one of the side walls of the basket and having a hook portion adapted to be fitted and secured over the top edge of the other side wall when the basket is collapsed so as to maintain the basket in a collapsed condition.

In another aspect of this invention, the bicycle basket described hereinabove is to be manufactured and sold in combination with a wire luggage rack. This luggage rack has a generally planar deck section and a bracket extending forwardly from the deck section and adapted to be secured to the frame of a bicycle. Extending downwardly from this deck section, there are two pair of diverging braces adapted to be received on opposite sides of a rear wheel of the bicycle upon which the luggage rack is to be mounted. Each pair of braces has lower ends adapted to be attached to a lower portion of the frame of the bicycle to which the luggage rack is to be mounted.

The generally planar deck section of this rear luggage rack comprises a rectangularly shaped outer border wire and a generally rectangularly shaped inner frame wire spaced inwardly from the rectangularly shaped border wire. There are cross wires extending laterally between opposite sides of the border wire of this deck section, which cross wires are welded at their opposite ends to opposite sides of the border wire and are welded intermediate of their ends to opposite sides of the rectangularly shaped inner frame wire.

One advantage of the bicycle basket of this application is that the collapsible basket may be easily attached and removed from the bicycle without the use of any fastener-type connectors. All that is required is for the pair of spaced hooks on the top of one of the side walls of the basket to be hooked over one side of the rear luggage rack and the loop-shaped bungee cord looped over a lower portion of the luggage rack or connected via an S-shaped connecting hook to the lower portion of the luggage rack.

These and other objects and advantages of this invention will be more readily apparent from the following description of the drawings, in which.

DETAILED DESCRIPTION OF THE DRAWINGS

Figure 1:
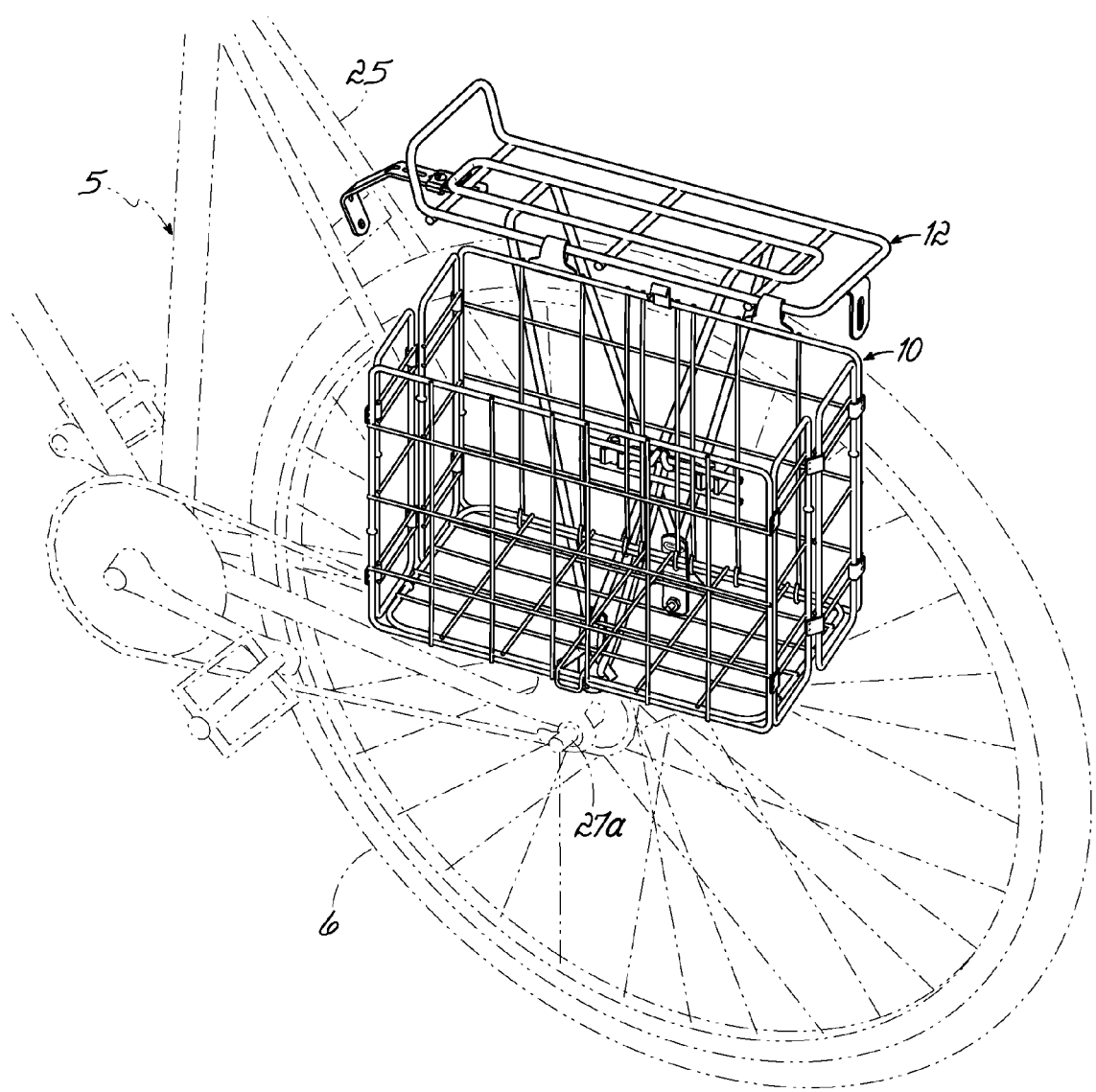
FIG. 1 is a perspective view of a bicycle luggage rack and collapsible detachable basket incorporating the invention of this application, the luggage rack and basket being shown in solid lines, and the rear portion of a bicycle to which the rack and basket are mounted being shown in phantom.
Figure 2:
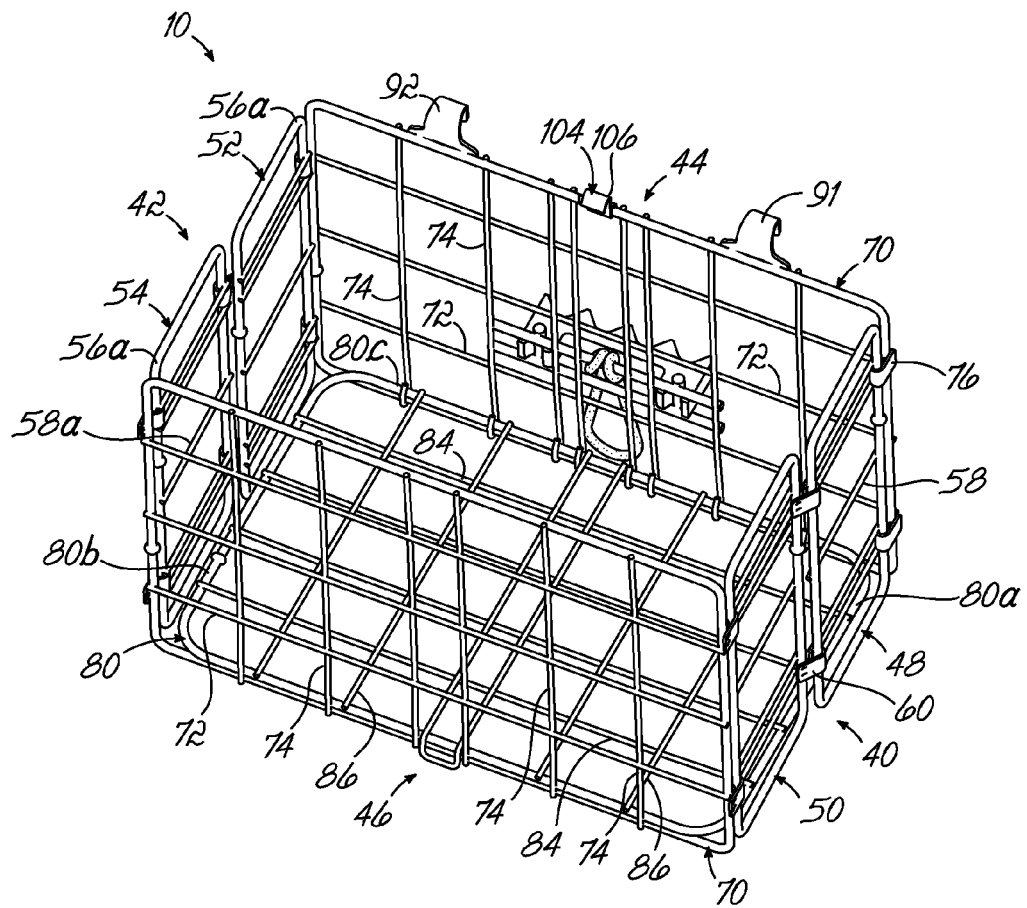
FIG. 2 is an enlarged perspective view of the basket of FIG. 1.
Figure 3:
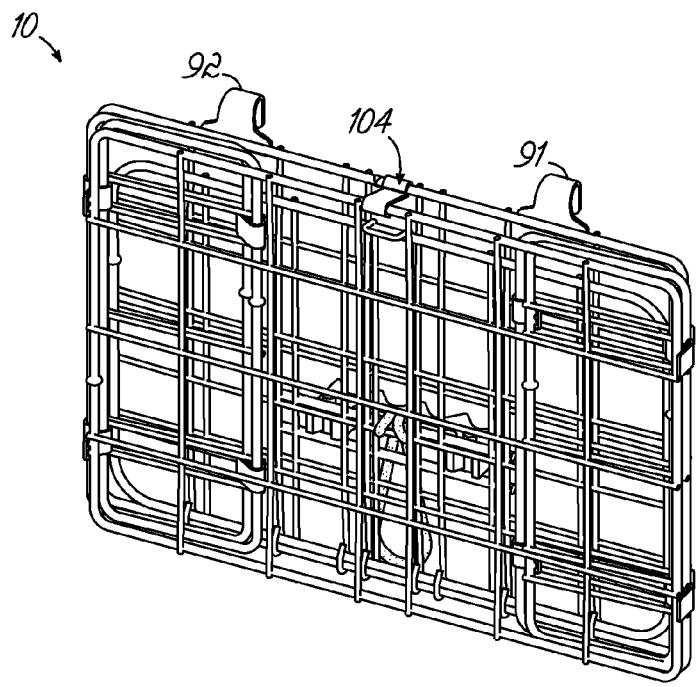
FIG. 3 is a perspective view of the basket of FIG. 2, but illustrating the basket in a collapsed condition.

With reference first to FIG. 1, there is illustrated a collapsible bicycle basket 10 incorporating the invention of this application and mounted upon a luggage rack 12 of a conventional bicycle 5. Since the bicycle 5 forms no part of the invention of this application, it has been illustrated in phantom in FIG. 1. In this figure, a single basket 10 is illustrated as attached to one side of the luggage rack 12, but it is to be understood that in general practice, there are two such baskets 10 mounted upon the luggage rack 12 on each side of the rear wheel 6 of the bicycle 5. One skilled in the art will appreciate that the current invention is not limited by the number of baskets 10 mounted to the luggage rack 12. For purposes of clarity of the drawing, only a single basket 10 has been illustrated in FIG. 1 and throughout the drawings of this application.

Luggage Rack

Figure 4:
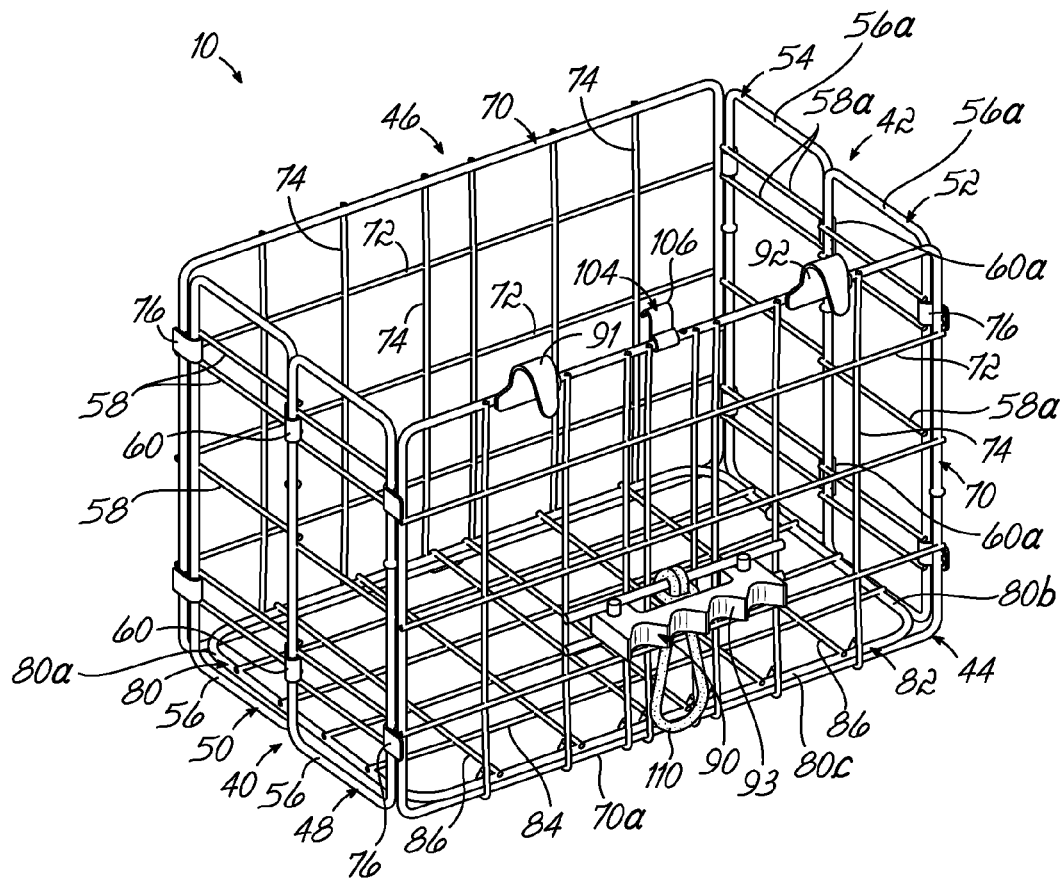
FIG. 4 is a perspective view of the basket of FIG. 1, but viewed from the opposite side of the basket from that shown in FIGS. 1 and 2.
Figure 5:
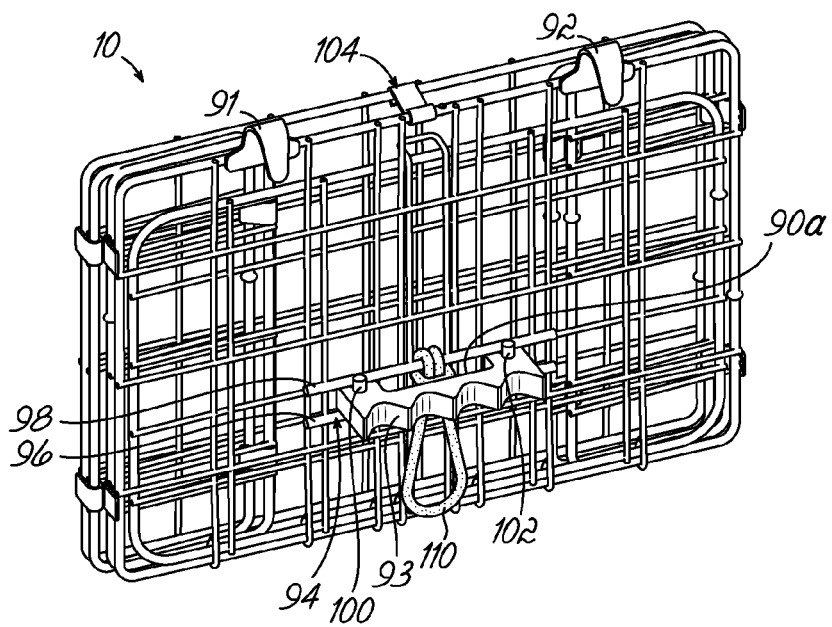
FIG. 5 is a perspective view of the collapsed basket of FIG. 4.
Figure 5A:
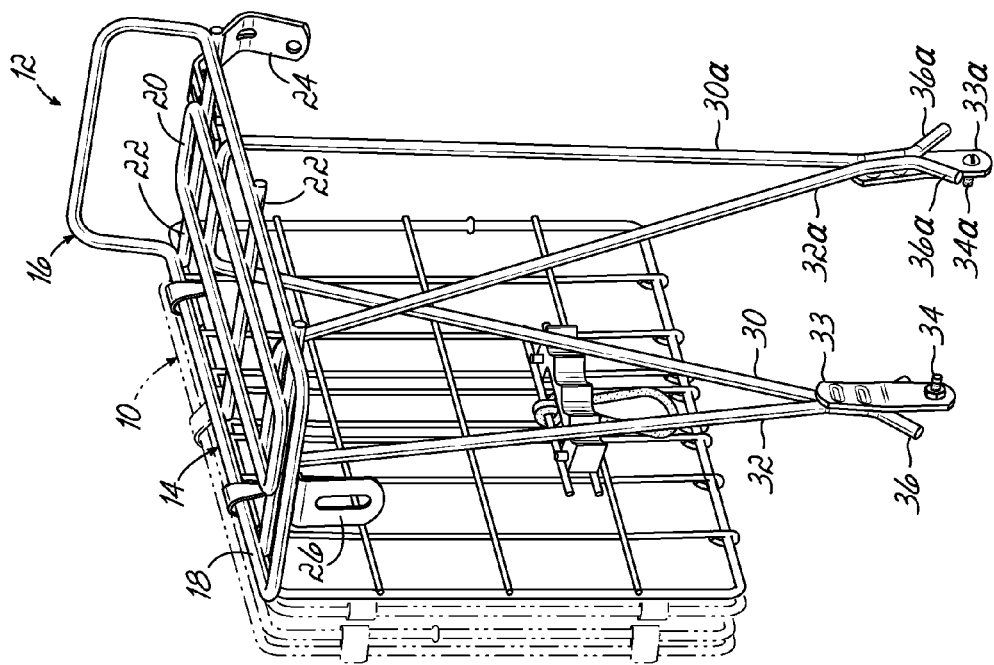
FIG. 5A is a view similar to FIG. 5, but showing the basket collapsed while partially attached to the luggage rack and with a portion of the collapsed basket illustrated in phantom.
Figure 4A:
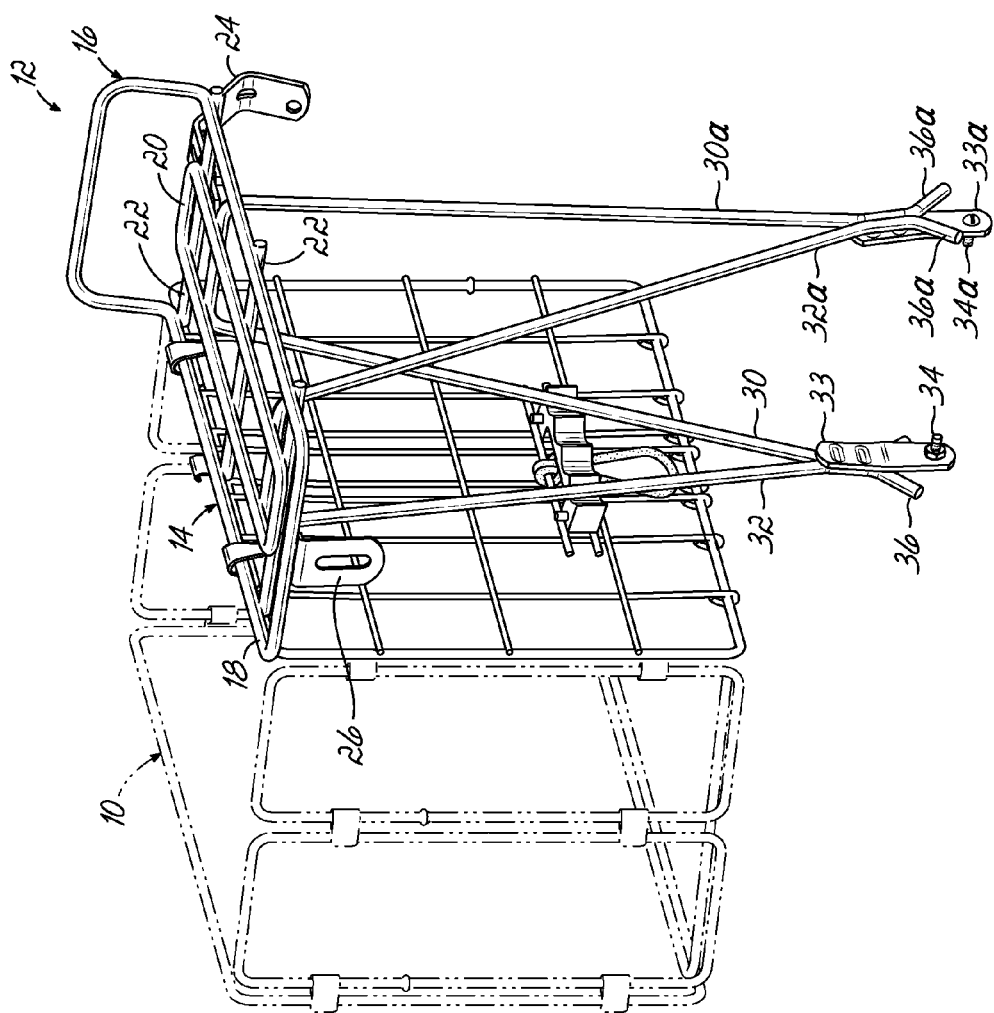
FIG. 4A is a perspective view of the basket of FIG. 4, but illustrating the basket partially attached to the luggage rack with a portion of the basket shown in phantom.
Figure 6:
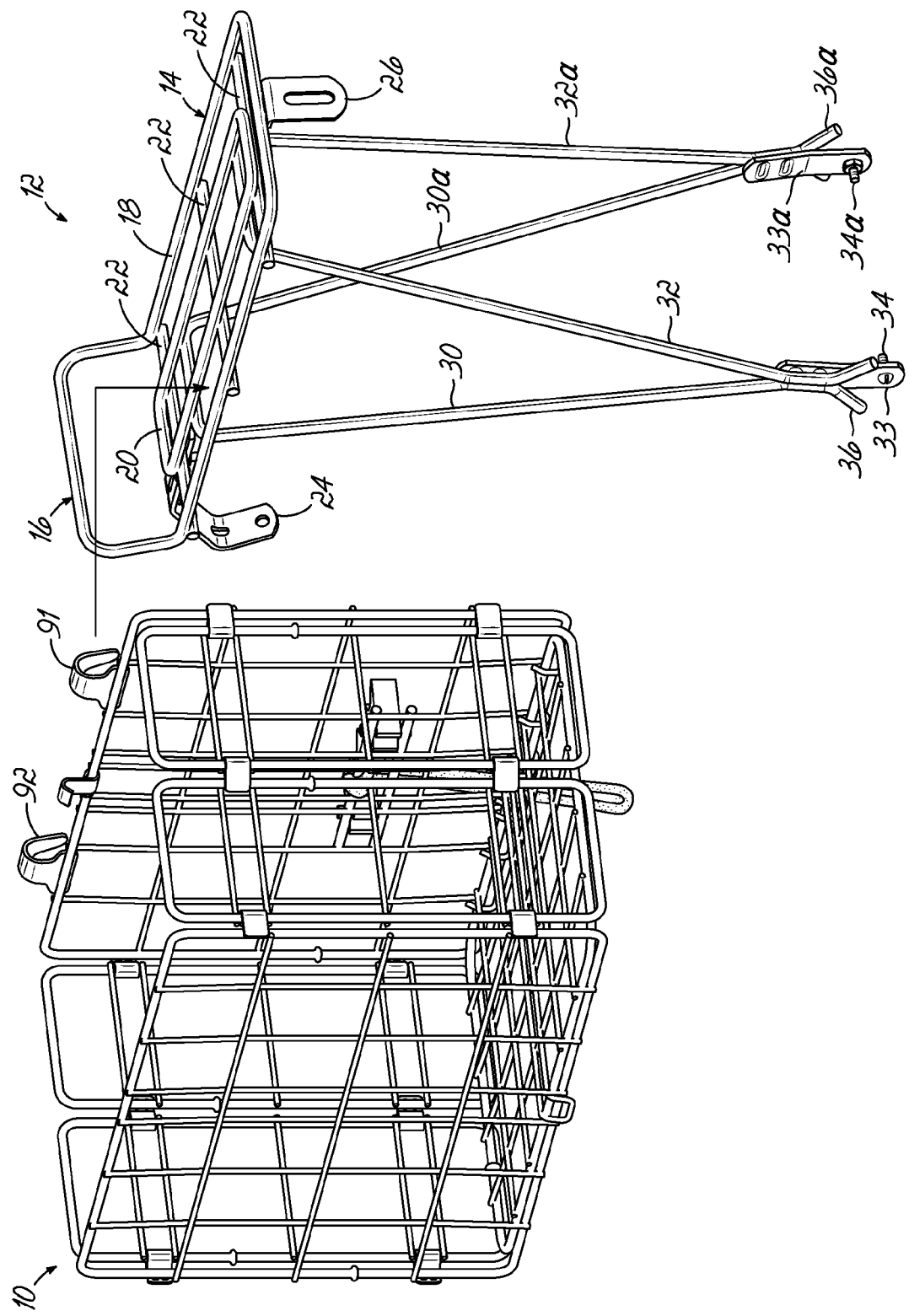
FIG. 6 is a perspective view of the basket and the luggage rack spaced apart, but illustrating how the two are assembled.

The luggage rack 12 is best illustrated in FIGS. 4A, 5A and 6 of this application. Although the luggage rack 12 illustrated in FIGS. 4A, 5A and 6 is a rear luggage rack 12 adapted to be mounted above the rear wheel 6 of the bicycle 5, one skilled in the art will appreciate that the luggage rack 12 can include alternative embodiments such as a front luggage rack (not shown) adapted to be mounted above the front wheel of the bicycle 5. This luggage rack 12 comprises a generally planar rear deck section 14 having an upturned front end section 16. The rear deck section 14 is formed by a generally rectangularly shaped border wire 18, the front end of which is turned upwardly to form the upturned front end section 16 of the luggage rack 12.

Spaced inwardly from the rectangularly shaped border wire 18, there is a rectangularly shaped inner frame wire 20 which is connected to the outer border wire 18 by cross wires 22. These cross wires 22 are welded at their outer ends to opposite sides of the border wire 18 and intermediate of their ends to the underside of the inner frame wire 20. In order to enable the rear luggage rack 12 to be attached to the frame of the bicycle 5, there is a brace bracket 24 welded at its rearward end to the forwardmost cross wire 22. This brace bracket extends forwardly from the deck section 14 of the luggage rack 12 and is intended to be connected by conventional connectors to the frame 25 of the bicycle 5. Mounted on the rear portion of the deck portion of the luggage rack 12, there is a safety appliance mounting bracket 26 welded to the rear portion of the border wire 18. This mounting bracket 26 is intended to receive a safety light or reflector, as is conventional with most bicycles.

In order to mount the rear deck portion 14 of the luggage rack 12 to the bicycle frame, there are a pair of converging braces 30, 32 and 30a, 32a extending downwardly from each side of the luggage rack 12. Each pair of braces 30, 32 and 30a, 32a are to be received on opposite sides of the rear wheel 6 of the bicycle 5. At the point of convergence of the braces 30, 32, they are welded to a sheet metal connector link 33, the lower end of which is apertured so as to accommodate a conventional nut and bolt fastener 34. Similarly, at the point of convergence of the braces 30a and 32a, they are welded to a sheet metal connector link 33a, the lower end of which is also apertured to accommodate a conventional nut and bolt fastener 34a. The fasteners 34 and 34a enable the deck portion of the luggage rack 12 to be supported from a rear portion of the bicycle frame 25 when the fasteners 34, 34a are attached to a rear portion of the bicycle frame adjacent the rear wheel axle 27a (FIG. 1). In practice, and for ease of manufacture, each of the braces 30, 30a is formed from a generally inverted U-shaped section of wire, and similarly, braces 32, 32a are formed from a single inverted U-shaped wire. At their upper ends, each of these U-shaped wires is welded to the underside of the inner frame wire 20 of the luggage rack 12.

At their lower ends, each of the braces 30, 32 and 30a, 32a has an outwardly flared end section 36 located beneath the point at which the braces are welded to the connector links 33, 33a. As explained more fully hereinafter, these outwardly flared end sections 36, 36a function to facilitate connection of the lower portion of the basket 10 to the lower portion of the rear luggage rack 12.

Collapsible Bicycle Basket

The bicycle basket 10 is illustrated in its erected condition in FIG. 4 and in its collapsed condition in FIG. 5.

The detachable collapsible basket 10 comprises a front wall 40, a rear wall 42 and a pair of side walls 44, 46. The front wall 40 comprises a pair of hingedly connected rigid panels 48, 50 and similarly, the rear wall 42 comprises a pair of hingedly connected rigid panels 52, 54. Each of the rigid panels 48, 50 is formed from a rectangular border wire 56 between the opposite sides of which there extends lateral cross wires 58. These cross wires 58 are welded at their opposite ends to opposite sides of the border wires 56. As may be seen most clearly in FIG. 4, there are sheet metal clips 60 which interconnect adjacent sides of the panels 48 and 50 and function as hinges between the panels 48 and 50. Similarly, the rear wall 42 comprises the rigid panels 52 and 54, each of which is formed by a rectangularly shaped border wire 56a between the opposite sides of which there extend connector wires 58a. These connector wires 58a of the rear panels 52, 54 are also welded at their opposite ends to opposite sides of the border wire 56a. Hingedly connecting the two panels 52, 54, there are sheet metal hinge clips 60a.

Each of the side walls 44 and 46 are made in the form of individual rigid panels. Each panel forming the side walls 44, 46 is made from a rectangular border wire 70 between the opposite sides of which there extend lateral connector wires 72, the opposite ends of which are welded to opposite sides of the border wire 70. There are also a plurality of connector wires 74 extending vertically between the top and bottom edges of the border wire 70 in each of the side wall panels 44 and 46. Sheet metal hinge clips 76 connect each of the panels of the side walls 44, 46 to one panel of the front wall 40 and rear wall 42. Thereby, when the basket 10 is to be collapsed, the two panels 48, 50 of the front wall and the two panels 52, 54 of the rear wall may be folded inwardly about the hinge clips 76. The basket 10 also includes a bottom wall 80 in the form of a rigid panel having a rectangular border wire 82. A plurality of connector wires 84 extend from the front edge 80a of this bottom wall 80 to the rear edge 80b of the bottom wall 80. Additionally, there are a plurality of connector wires 86 which extend between the side edges of the bottom panel 80. All of these connector wires 84, 86 are welded at their ends to the border wire 82. Additionally, these connector wires 84, 86 of the bottom panel 80 are welded at their intersections.

The bottom wall panel 80 is hingedly connected to one of the side walls 44 by wrapping of the vertical connector wires 74 of the side wall 44 about the bottom edge 70a of the border wire 70 of the side wall 44 and the side edge 80c of the bottom wall 80. Thereby, the bottom wall 80 may be folded upwardly parallel to the side wall 44 when the basket 10 is collapsed with the wrap-around ends of the vertical wires 74 of the side wall 44 functioning as hinges during this hinged or pivoting movement of the bottom wall 80 into parallel relationship with the side wall 44.

In order to mount the basket 10 on the rear luggage rack 12, there are a pair of outwardly extending sheet metal hooks 91, 92 mounted on the top edge of the side wall 44. These hooks 91, 92 are welded to the top portion of the border wire 70 of the side wall 44 and extend outwardly therefrom. In some embodiments, the hooks 91, 92 may include protective sleeves (not shown) coupled to the hooks 91, 92 to prevent the metal hooks 91, 92 from roughly engaging and scratching up the luggage rack 12.

In order to space the basket 10 from the bicycle frame and the luggage rack 12 and prevent rattling between the basket 10 and the frame or the luggage rack 12, there is a spacer 90 mounted upon the outside surface of the sidewall 44. By limiting contact between the basket 10 and the luggage rack 12, the spacer 90 is adapted to prevent rubbing and scratching of the basket 10 and luggage rack 12. This spacer 90 has a generally sawtooth-shaped outer surface 93 which, as explained more fully hereinafter, receives the converging braces 30, 32 or 30a, 32a of the luggage rack 12 when the basket 10 is mounted upon the luggage rack 12. This spacer 90 is preferably made from molded plastic (e.g., molded rigid urethane or molded rigid polyethylene) or a flexible material, such as rubber. However, the spacer 90 may also be formed by extrusion or water jet cutting rather than molding. The spacer 90 is secured to the side wall 44 of the basket 10 by a spacer-mounting brace 94. This brace 94 comprises a pair of horizontal bars 96, 98 welded to the outside surface of the side wall connector wires 74, and a pair of spaced vertical bars 100, 102 welded to the horizontal bars 96, 98. Keyhole-shaped slots in the rear surface of the spacer 90 snap over the vertical bars 100, 102 so as to secure the spacer 90 to the spacer mounting brace 94.

In order to secure the lower portion of the basket 10 to the lower portion of the rear luggage rack 12 of the bicycle 5, there is a resilient connector 110, such as an endless loop bungee cord, mounted upon the bottom portion of the side wall 44 of the basket 10. This endless bungee cord 110 is secured to the lower portion of the side wall 44 by wrapping of a portion of the loop over the horizontal mounting bar 98 and then extending the remainder of the loop through that wrapped around portion. Preferably, there is a recess 90a in the rear portion of the spacer 90 through which the loop of the bungee cord 110 extends downwardly. But it is understood that this loop could be attached to any lower portion of the side wall 44 of the basket 10 in the same manner, i.e., by wrapping the bungee cord 110 about a cross wire connector or a bottom edge portion of the border wire 70 forming that side wall panel 44 rather than around a bar 98 of the spacer mounting brace 94.

Now with reference to FIGS. 4 and 5, it will be seen that there is a hook-shaped locking clip 104 pivotally mounted upon the top portion of the border wire 70 of the side wall 44. This clip has a hook-shaped end portion 106 receivable over the top portion of the border wire 70 of the opposite side wall 46 to lock the basket 10 in a collapsed condition, as illustrated in FIG. 5.

Detachable Mounting of Basket on Rear Luggage Rack

Figure 7:
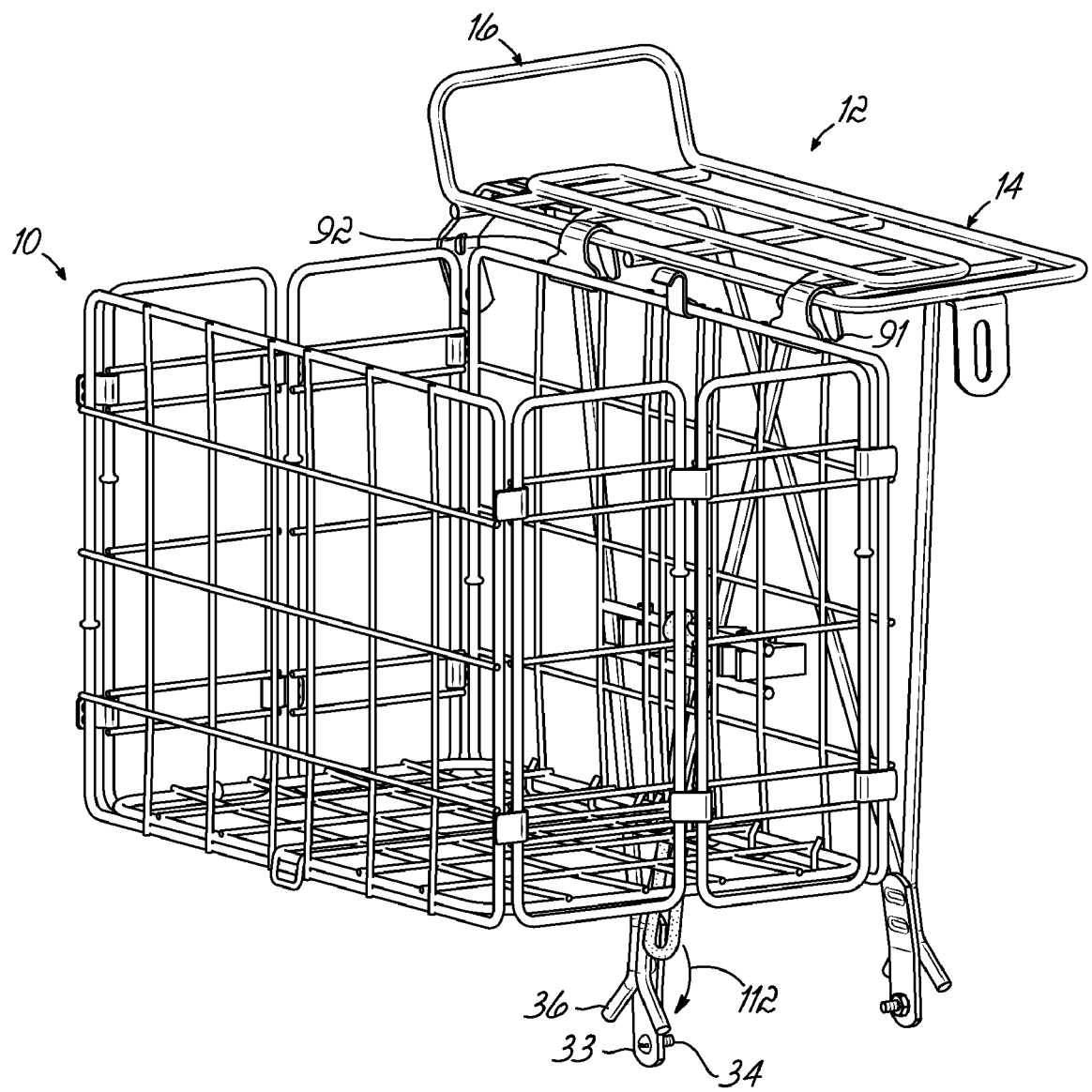
FIG. 7 is a view similar to FIG. 6, but illustrating the basket attached to the luggage rack, but prior to attachment of the lower portion of the basket to the lower portion of the luggage rack.
Figure 8:
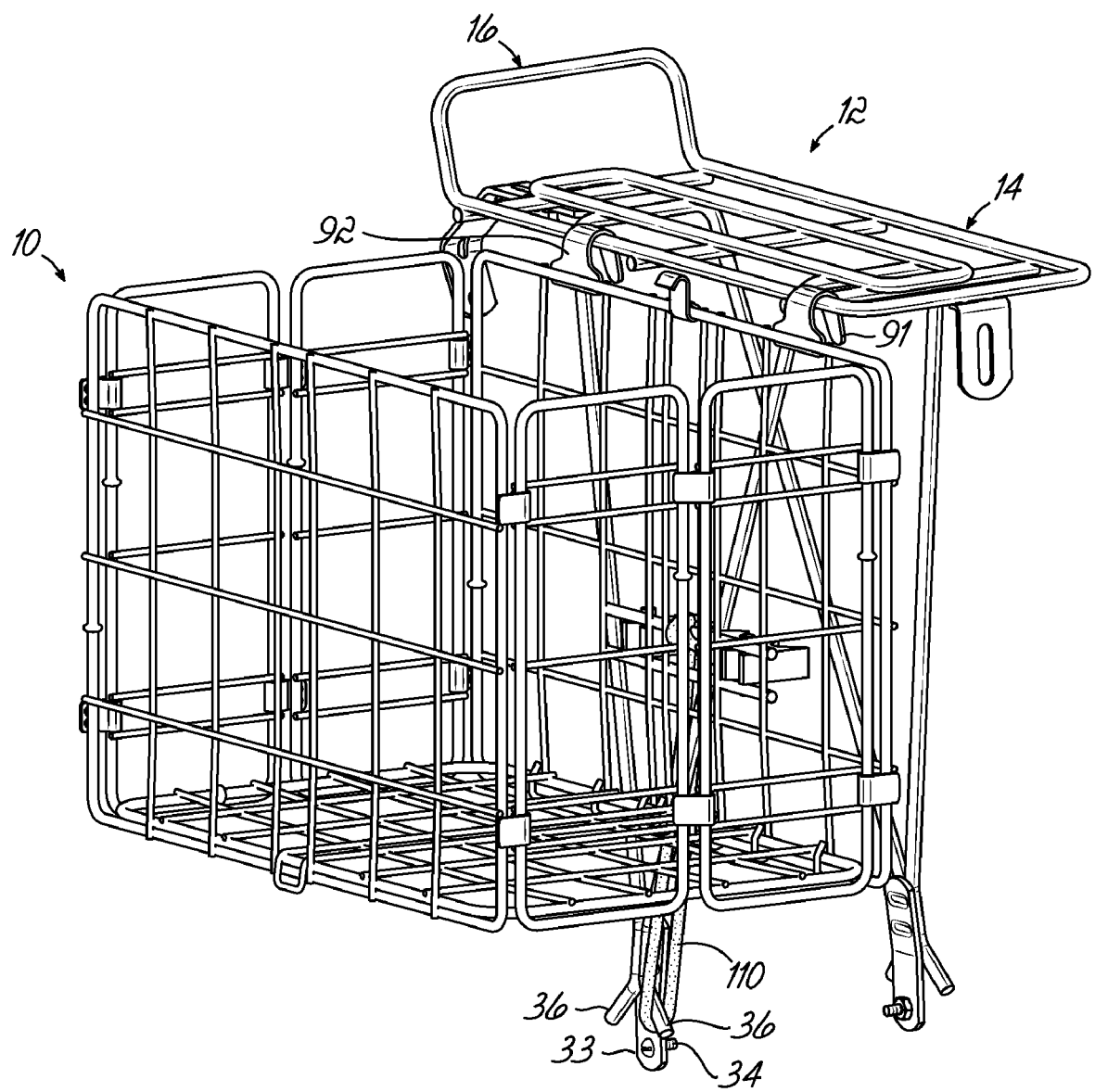
FIG. 8 is a view similar to FIG. 7 illustrating the basket attached to the rack, both at the top and at the bottom of the rack.

The detachable mounting of the basket 10 on the luggage rack 12 is best illustrated in FIGS. 6, 7 and 8 of the drawings of this application. With reference to FIG. 6, it will be seen that the basket 10 is mounted on the luggage rack 12 by placement of the hooks 91, 92 over a side wall portion of the border wire 18 of the rear deck section 14 of the luggage rack 12. The basket 10 is generally moved horizontally to a position in which the braces 30, 32 of the luggage rack 12 fit within recesses of the spacer 90, as illustrated in FIGS. 4A and 5A. The depending loop portion of the bungee cord 110 is then pulled downwardly, as indicated by the arrow 112 (FIG. 7), and placed over the outwardly flared end portion 36 of one of the braces 30, 32. Thereby, a downwardly directed force is placed upon the basket 10 so as to maintain the hooks 91, 92 of the basket 10 in engagement with the border wire 18 of the luggage rack 12. The basket 10 is then maintained in a secure position on the luggage rack 12, in which position it will remain without bouncing or other movement when the bicycle 5 moves over an uneven or bumpy surface because of the downward force applied to the basket 10 by the resilient bungee cord 110. Because of the location of the braces 30, 32 of the luggage rack 12 in the indentations of the spacer 90, there is no tendency for the basket 10 to move backwards or forwards on the border wire 18 of the luggage rack 12 even if the bicycle 5 moves over a uneven or bumpy surface.

With reference now to FIG. 5A, it will be seen that the basket 10 may be maintained on the luggage rack 12 in either a fully open condition of the basket 10 (FIG. 4A) or in a fully collapsed condition, as illustrated in FIG. 5A. If the basket 10 is to be moved from a fully open position, as illustrated in FIG. 4A to a fully closed position, as illustrated in FIG. 5A while the basket 10 is maintained on the luggage rack 12, all that is required is to move the locking hook 104 upwardly, push the bottom wall 80 of the basket 10 upwardly into a position parallel to the side wall 44, collapse the front and rear walls 40, 42 inwardly about their respective hinges 60, and then pivot the lock 104 on the side wall 44 downwardly into a position in which the hook portion 106 of the lock 104 engages the top edge of the wall 70, as illustrated in FIG. 5A. Thereby, the basket 10 will be maintained in a fully closed position in which the bicycle 5 to which the luggage rack 12 is mounted may be transported with the basket 10 collapsed.

ALTERNATIVE EMBODIMENTS OF THE BASKET

Figure 9:
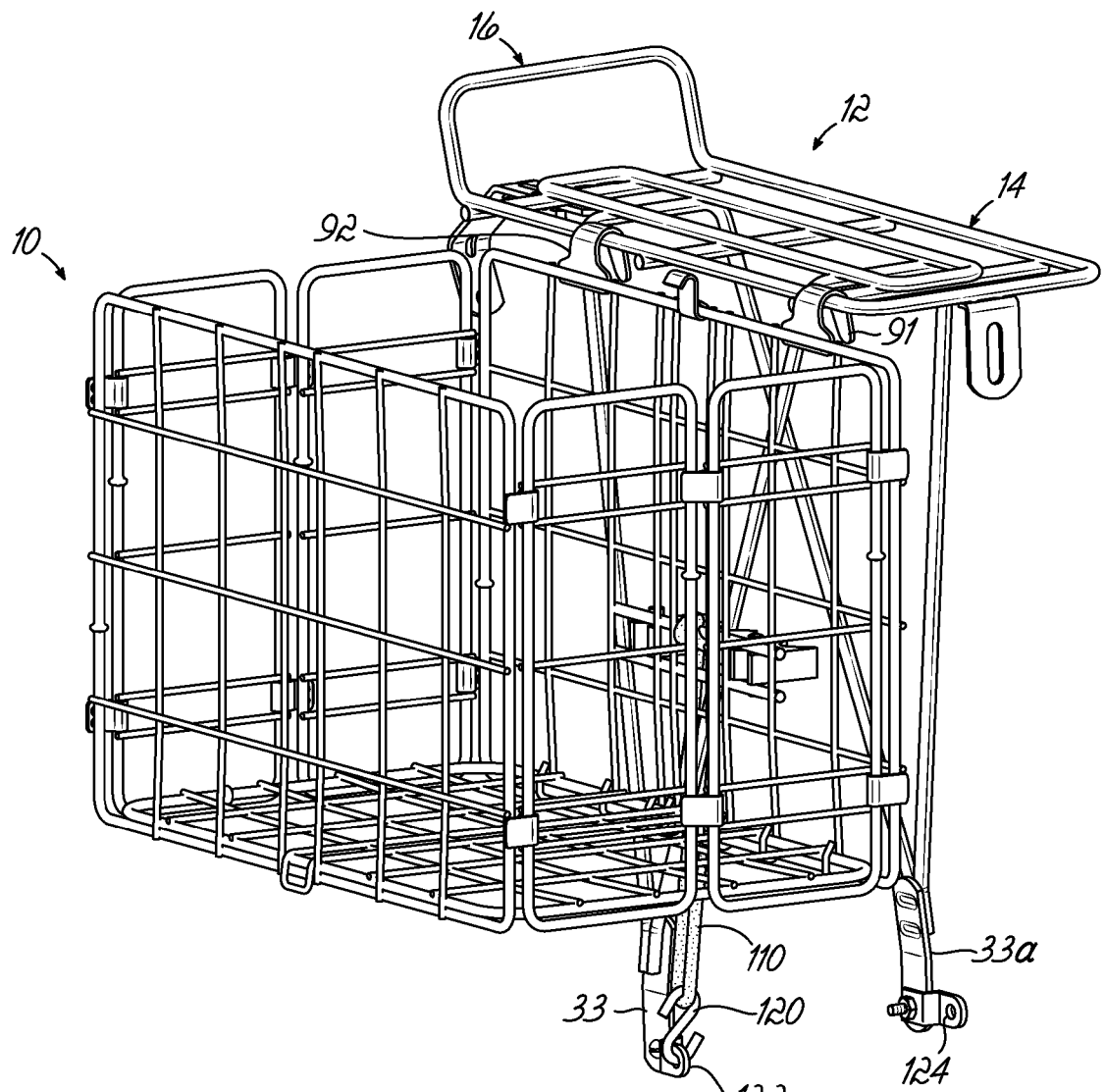
FIG. 9 is a view similar to FIG. 8, but illustrating an alternative mode of attachment of the lower portion of the basket to the lower portion of the luggage rack.

With reference now to FIG. 9, there is illustrated an embodiment of the luggage rack 12 and basket 10 of this invention which is identical to the embodiment of FIGS. 1-8 except that the lower portion of the side wall 44 of the basket 10 is attached to the lower portion of the luggage rack 12 by the bungee cord 110 and an S-shaped hook 120 rather than by having the bungee cord 110 fitted over the outwardly flared section 36 of the depending braces 30, 32 or 30a, 32a. As illustrated in this embodiment, the link 33 has an extension 122 formed thereon or coupled to the link 33, the extension 122 having an aperture 124 therein. The S-shaped hook 120 has an upper portion of the hook 120 extending through the loop of the bungee cord 110 and a lower portion of the hook 120 extending through the aperture 124 so as to secure the lower portion of the side wall 44 of the basket 10 to the lower portion of the luggage rack 12. Of course, this hook 120 as well could extend through an aperture in the lower portion of the bicycle frame rather than an aperture in a link at the bottom of the luggage rack 12.

Figure 10:
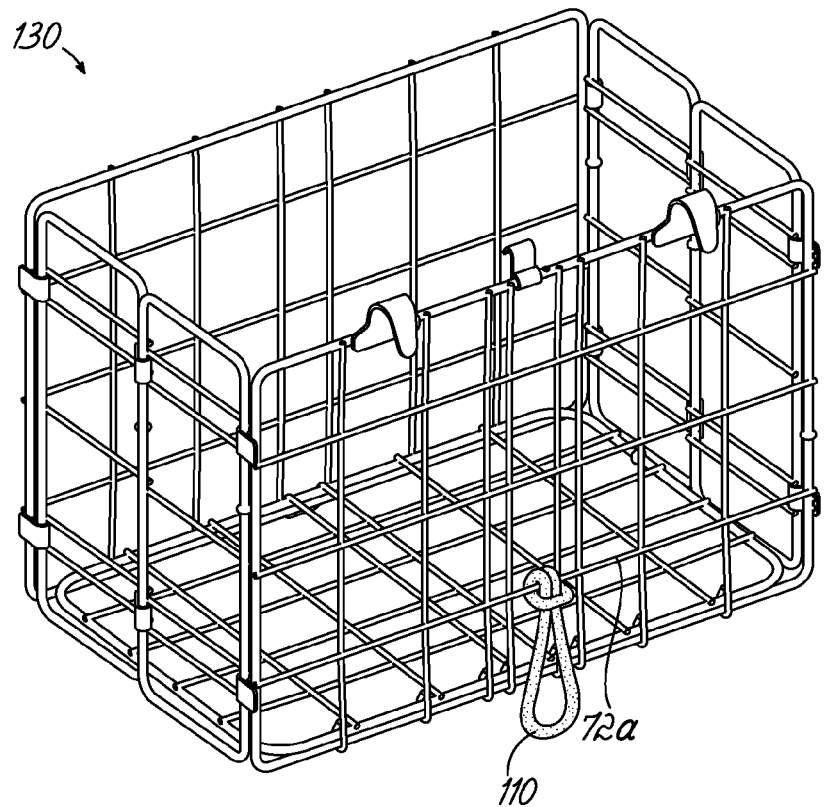
FIG. 10 is a perspective view of the collapsible basket of FIG. 4, but with the spacer removed from the basket.
Figure 11:
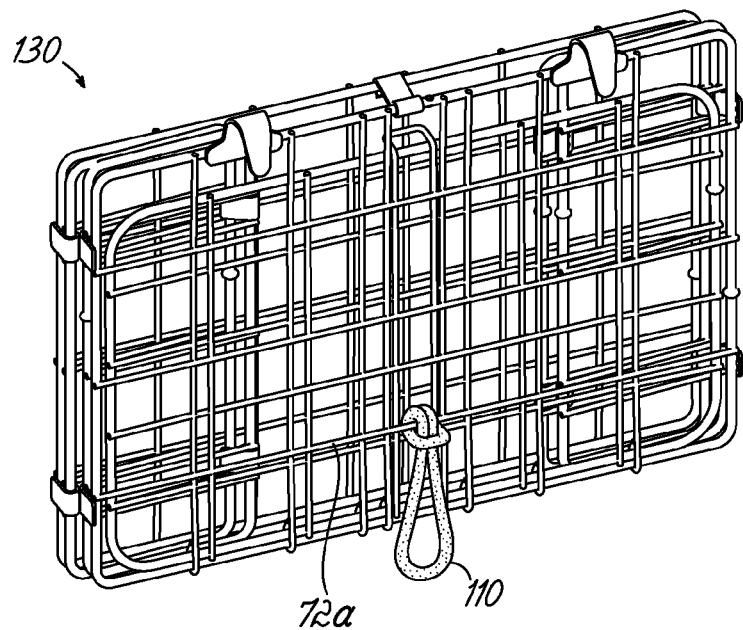
FIG. 11 is a view similar to FIG. 5, but again, with the spacer removed from the rack.

FIGS. 10 and 11 illustrate yet another embodiment of the basket 130 wherein there is no spacer 90 on the side wall of the basket 130 and there is no spacer mounting bracket 94. In this embodiment, the loop-shaped bungee cord 110 is wrapped about one of the horizontal connector wires 72a of the side wall 44. In all other respects, the basket 130 is identical to the basket 10 of FIGS. 1-8.

While we have described several different embodiments of the invention of this application, persons skilled in the art will appreciate numerous changes and alternatives which may be made without departing from the spirit of this invention. Therefore, we do not intend to be limited except by the scope of the appended claims.

We claim:

1. A folding basket adapted to be detachably secured to a luggage rack of a bicycle without the use of any threaded fasteners, said folding basket comprising:
    a pair of opposed front and back walls, each front and back wall comprising a pair of hingedly interconnected rigid panels;
    a pair of opposed side walls, each side wall comprising a rigid panel hingedly connected at its opposite ends to one of said front and back walls;
    a bottom wall comprising a rigid panel, said bottom wall being hingedly connected along one edge to the bottom edge of one of said side wall panels;
    said basket being adapted to be folded into a flat condition when said bottom wall is folded upwardly into a position parallel said side walls and said front and back walls are collapsed inwardly about a hinge connector between the panels of said front and back walls;
    said basket having a pair of spaced hooks fixedly secured to one of said side walls adjacent to the top edge of said one side wall, said hooks being adapted to be received over a portion of a luggage rack of a bicycle
    said basket having a resilient connector mounted upon said one side wall of said basket, said resilient connector being adapted to extend between a lower portion of said one side wall of said basket and one of either a lower portion of luggage rack or said bicycle frame so as to pull said one side wall of said basket downwardly to maintain said hooks in engagement with said portion of said luggage rack over which the hooks are adapted to be received; and
    a spacer fixedly mounted upon the lower portion of said one side wall of said basket, said spacer having a generally saw-shaped outer surface adapted to receive braces of said luggage rack and maintain said one side wall spaced from said braces.

2. The folding basket of claim 1 wherein said resilient connector comprises an endless loop of bungee cord.

3. The folding basket of claim 1 wherein each of said panels comprises a rectangularly shaped border wire and a plurality of parallel connector wires extending between opposite sides of said border wires, said connector wires being welded at their ends to said border wires.

4. The folding basket of claim 3 wherein the connector wires of each of said side wall and bottom wall panels has a first plurality of said connector wires extending laterally between opposite sides of said border wires of said side and bottom wall panels and a second plurality of connector wires extending normal to the first plurality of connector wires, said first and second plurality of connector wires being welded at their intersections.

5. The folding basket of claim 1 wherein the basket includes a generally hook-shaped locking clip hingedly connected to the top edge of one of said side walls of said basket, a hooked portion of said locking clip being adapted to be secured over the top edge of the other of said side walls when said basket is collapsed so as to maintain said basket in a collapsed condition.

6. In combination, a bicycle rear luggage rack and a folding basket detachably secured to said rear luggage rack without the use of any threaded fasteners;
    said rear luggage rack comprising:
        a generally planar deck section and a brace bracket extending forwardly from said deck section adapted to be secured to the frame of a bicycle;
        said luggage rack having first and second pairs of converging braces extending downwardly from opposite sides of said deck section of said rack, said first and second pairs of converging braces being adapted to be received over opposite sides of a rear wheel of a bicycle upon which said luggage rack is to be mounted, and each pair of braces having lower ends adapted to be attached to a lower portion of the frame of the bicycle to which the luggage rack is to be mounted;
    said folding basket comprising:
        a pair of opposed front and back walls, each front and back wall comprising a pair of hingedly interconnected rigid panels;
        a pair of opposed side walls, each side wall comprising a rigid panel hingedly connected at its opposite ends to one of said front and back walls;
        a bottom wall comprising a rigid panel, said bottom wall being hingedly connected along one edge to a bottom edge of one of said side wall panels;
        said basket being adapted to be folded into a flat condition when said bottom wall is folded upwardly into a position parallel said side walls and said front and back walls are collapsed inwardly about a hinge connector between the panels of said front and back walls;
        said basket having a pair of spaced hooks fixedly secured to one of said side walls adjacent to the top edge of said one side wall, said hooks being received over a portion of the deck section of the rear luggage rack; and
        said basket having a resilient connector mounted upon said one side wall of said basket, said resilient connector extending between a lower portion of said one side wall of said basket and a lower portion of the braces of the luggage rack so as to pull said one side wall of said basket downwardly to maintain said hooks in engagement with said portion of said deck section of the luggage rack over which the hooks are received; and
        a spacer fixedly mounted upon the lower portion of said one side wall of said basket, said spacer having a generally saw-shaped outer surface, the braces of said rear luggage rack being received within indentations of said saw-shaped outer surface of said spacer to maintain said one side wall spaced from said braces and limit movement of said basket relative to said braces.

7. The combination of claim 6 wherein said resilient connector comprises an endless loop of bungee cord.

8. The combination of claim 6 wherein each of said panels comprises a rectangularly shaped border wire and a plurality of parallel connector wires extending between opposite sides of said border wires, said connector wires being welded at their ends to said border wires.

9. The combination of claim 8 wherein the connector wires of each of said side wall and bottom wall panels has a first plurality of said connector wires extending laterally between opposite sides of said border wires of said side and bottom wall panels and a second plurality of connector wires extending normal to the first plurality of connector wires, said first and second plurality of connector wires being welded at their intersections.

10. The combination of claim 6 wherein the basket includes a generally hook-shaped locking clip hingedly connected to the top edge of one of said side walls of said basket, a hooked portion of said locking clip being adapted to be secured over the top edge of the other of said side walls when said basket is collapsed so as to maintain said basket in a collapsed condition.

11. The combination of claim 6 wherein the generally planar deck section of said rear luggage rack comprises a generally rectangularly shaped border wire having an upturned forward end portion.

12. In combination, a bicycle rear luggage rack and a folding basket detachably secured to said rear luggage rack without the use of any threaded fasteners;
    said rear luggage rack comprising:
    a generally planar deck section comprising a generally rectangularly shaped border wire having an upturned forward end portion and a brace bracket extending forwardly from said deck section adapted to be secured to the frame of a bicycle;
    said luggage rack having first and second pairs of converging braces extending downwardly from opposite sides of said deck section of said rack, said first and second pairs of converging braces being adapted to be received over opposite sides of a rear wheel of a bicycle upon which said luggage rack is to be mounted, and each pair of braces having lower ends adapted to be attached to a lower portion of the frame of the bicycle to which the luggage rack is to be mounted;
    said folding basket comprising:
    a pair of opposed front and back walls, each front and back wall comprising a pair of hingedly interconnected rigid panels;
    a pair of opposed side walls, each side wall comprising a rigid panel hingedly connected at its opposite ends to one of said front and back walls;
    a bottom wall comprising a rigid panel, said bottom wall being hingedly connected along one edge to a bottom edge of one of said side wall panels;
    said basket being adapted to be folded into a flat condition when said bottom wall is folded upwardly into a position parallel said side walls and said front and back walls are collapsed inwardly about a hinge connector between the panels of said front and back walls;
    said basket having a pair of spaced hooks fixedly secured to one of said side walls adjacent to the top edge of said one side wall, said hooks being received over a portion of the deck section of the rear luggage rack; and
    said basket having a resilient connector mounted upon said one side wall of said basket, said resilient connector extending between a lower portion of said one side wall of said basket and a lower portion of the braces of the luggage rack so as to pull said one side wall of said basket downwardly to maintain said hooks in engagement with said portion of said deck section of the luggage rack over which the hooks are received wherein the generally planar deck section of said rear luggage rack further comprises a generally rectangularly shaped inner frame wire spaced inwardly from the rectangularly shaped border wire and cross wires extending laterally between opposite sides of said border wire of said deck section, said cross wires being welded at their opposite ends to said opposite sides of said border wire of said deck section and welded intermediate of their ends to opposite sides of said rectangularly shaped inner frame wire.

13. The combination of claim 12 wherein upper ends of said pairs of converging braces of said luggage rack are welded to opposite sides of said rectangularly shaped inner frame wire.

14. A folding basket comprising:
    a pair of opposed front and back walls;
    a pair of opposed side walls;
    a bottom wall;
    said basket being adapted to be folded into a flat condition when said bottom wall is folded upwardly into a position parallel said side walls;
    said basket having a pair of spaced hooks, said hooks being adapted to be received over a portion of a luggage rack of a bicycle;
    said basket having a resilient connector mounted upon said one side wall of said basket, said resilient connector being adapted to extend between said one side wall of said basket and one of either a luggage rack or a bicycle frame so as to pull said one side wall of said basket downwardly; and
    a spacer mounted upon the lower portion of said one side wall of said basket, said spacer having a generally saw-shaped outer surface adapted to receive braces of said luggage rack and maintain said one side wall spaced from said braces.

15. The folding basket of claim 14 wherein said resilient connector comprises an endless loop of bungee cord.

* * * * *